United States Patent [19]
Stone et al.

[11] Patent Number: 5,700,113
[45] Date of Patent: Dec. 23, 1997

[54] SPADE-TYPE BORING BIT AND AN ASSOCIATED METHOD AND APPARATUS FOR FORMING METALLIC PARTS

[75] Inventors: Paul Andrew Stone, York County, Pa.; Rickey James Thomas, Caroll County, Md.

[73] Assignee: Black & Decker Inc., Newark, Del.

[21] Appl. No.: 366,986

[22] Filed: Dec. 30, 1994

[51] Int. Cl.$^6$ .................... B23B 35/00; B23B 51/02
[52] U.S. Cl. .................... 408/1 R; 76/108.1; 408/214; 408/225; 408/228
[58] Field of Search .................... 408/211, 213, 408/214, 224, 225, 226, 227, 228, 1 R, 230; 72/184, 185, 338, 342.1, 342.5, 375, 414; 76/108.1, 101.1

[56] References Cited

U.S. PATENT DOCUMENTS

| 85,107 | 12/1868 | Count .................... 408/224 |
|---|---|---|
| D. 240,263 | 6/1976 | Southall . |
| D. 278,065 | 3/1985 | Sydlowski et al. . |
| 606,319 | 6/1898 | Watrous . |
| 1,004,902 | 10/1911 | Potter . |
| 1,483,082 | 2/1924 | Dosimont . |
| 1,595,588 | 8/1926 | Tuttle . |
| 1,738,032 | 12/1929 | Behrman et al. . |
| 2,091,128 | 8/1937 | Anderson . |
| 2,159,842 | 5/1939 | Cook . |
| 2,206,292 | 7/1940 | Rosenberg . |
| 2,310,675 | 2/1943 | Boyce . |
| 2,326,106 | 8/1943 | Van Ness et al. . |
| 2,332,295 | 10/1943 | Bouchal . |
| 2,335,791 | 11/1943 | Rea . |
| 2,403,651 | 7/1946 | Fulke . |
| 2,543,206 | 2/1951 | Smith .................... 408/224 |
| 2,627,292 | 2/1953 | Kronwall . |
| 2,645,138 | 7/1953 | Mitchhart . |
| 2,681,673 | 6/1954 | Mackey . |
| 2,692,627 | 10/1954 | Stearns . |

(List continued on next page.)

FOREIGN PATENT DOCUMENTS

| 1097104 | 3/1981 | Canada . |
|---|---|---|
| 0118806 | 9/1984 | European Pat. Off. . |
| 2617-753A | 1/1989 | France . |
| 2636182 | 2/1978 | Germany . |
| 4207964A1 | 3/1992 | Germany . |
| 56-74343 | 6/1981 | Japan . |
| 63-52730 | 3/1988 | Japan . |
| 547268 | 2/1977 | U.S.S.R. . |
| 1277117 | 12/1969 | United Kingdom . |
| 2130935 | 6/1984 | United Kingdom . |
| 2271948 | 4/1994 | United Kingdom . |

*Primary Examiner*—Daniel W. Howell
*Attorney, Agent, or Firm*—Bell Seltzer Intellectual Property Law Group of Alston & Bird LLP

[57] ABSTRACT

The spade-type boring bit includes an elongate shank defining a central longitudinal axis and a blade portion joined to one end of the shank and including a pair of generally flat side segments extending laterally from the central longitudinal axis. Each side segment includes a respective forward cutting edge which are aligned with each other along a centerline which passes through the central longitudinal axis of the elongate shaft so as to increase the efficiency with which the spade bit drills. The spade bit also includes a spur joined to and extending axially from the forward end of the blade portion. The spur can include spur cutting edges separated radially, angularly and, in some instances, longitudinally or axially from the forward cutting edge of the adjacent side segment to prevent accumulation of chip swarf between the spur cutting edge and the adjacent forward cutting edge. The present invention also provides a method and apparatus of forging a plurality of parts from a continuous metal stock which provides for rapid fabrication of parts having fine features, such as a spade bit. In particular, the continuous metal stock is incrementally advanced and the leading portion of the metal stock is clamped following each incremental advance. Thereafter, a portion of the metal stock is forged, such as with radially closed dies which impart axial and radial forces to the metal stock which, in turn, generate compressive, tensile and shear stresses within the workpiece. The longitudinal growth of the continuous metal stock created during the forging is compensated by permitting upstream longitudinal constraint or movement of the continuous metal stock as appropriate for forming the part.

56 Claims, 7 Drawing Sheets

U.S. PATENT DOCUMENTS

| | | |
|---|---|---|
| 2,697,951 | 12/1954 | Muller . |
| 2,748,460 | 6/1956 | Ulrich . |
| 2,765,760 | 10/1956 | Lyon . |
| 2,782,824 | 2/1957 | Robinson . |
| 2,794,468 | 6/1957 | Huxtable . |
| 2,883,888 | 4/1959 | Stewart . |
| 2,962,066 | 11/1960 | Deliso . |
| 3,292,412 | 12/1966 | Costabile . |
| 3,354,690 | 11/1967 | Beckwell . |
| 3,381,515 | 5/1968 | Orloff . |
| 3,504,575 | 4/1970 | Makino et al. . |
| 3,824,026 | 7/1974 | Gaskins . |
| 3,920,350 | 11/1975 | Southall . |
| 3,997,279 | 12/1976 | Porter . |
| 4,012,970 | 3/1977 | Hintz et al. . |
| 4,050,841 | 9/1977 | Hildebrandt . |
| 4,286,904 | 9/1981 | Porter et al. . |
| 4,620,822 | 11/1986 | Haque et al. . |
| 4,625,593 | 12/1986 | Schmotzer . |
| 4,682,917 | 7/1987 | Williams, III et al. . |
| 4,753,558 | 6/1988 | Jansson . |
| 4,759,667 | 7/1988 | Brown . |
| 4,836,006 | 6/1989 | Brown . |
| 4,838,062 | 6/1989 | Prenn . |
| 4,950,111 | 10/1990 | Thomas . |
| 5,056,967 | 10/1991 | Hageman . |
| 5,061,127 | 10/1991 | Thomas . |
| 5,099,933 | 3/1992 | Schimke et al. . |
| 5,145,018 | 9/1992 | Schimke et al. . |
| 5,149,234 | 9/1992 | Durfee, Jr. . |
| 5,184,689 | 2/1993 | Sheirer et al. . |
| 5,193,951 | 3/1993 | Schimke . |
| 5,221,166 | 6/1993 | Bothum . |
| 5,286,143 | 2/1994 | Schimke . |
| 5,291,806 | 3/1994 | Bothum . |
| 5,299,441 | 4/1994 | Shinjo . |
| 5,452,970 | 9/1995 | Sundstrom . |

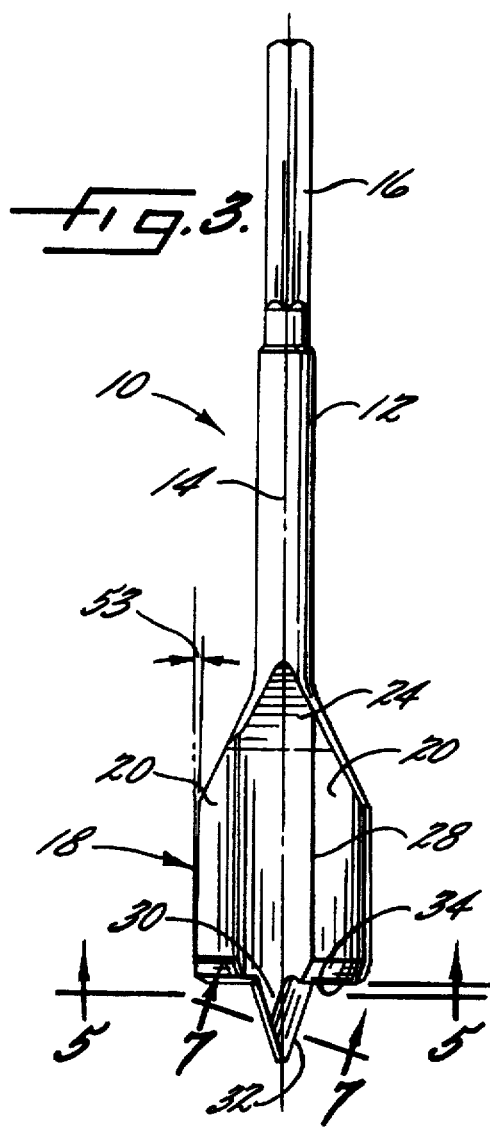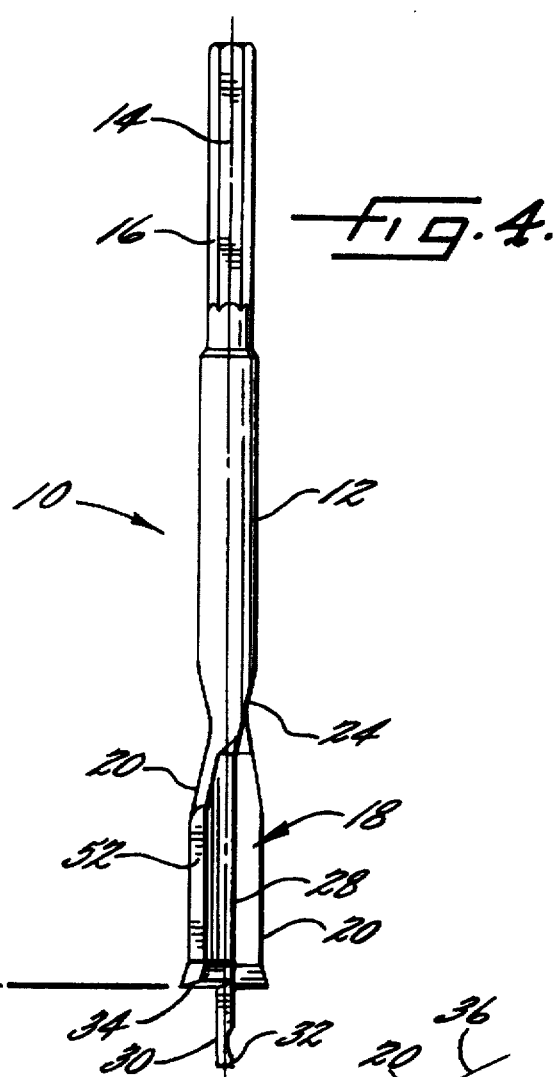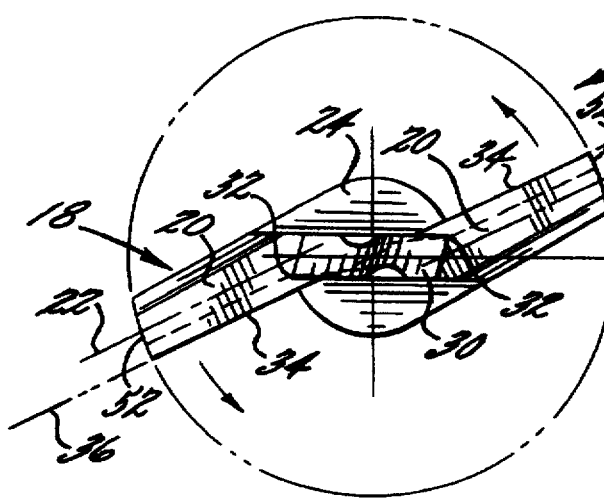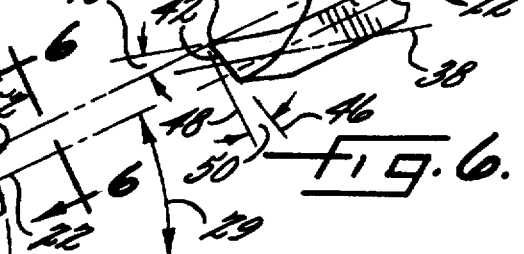

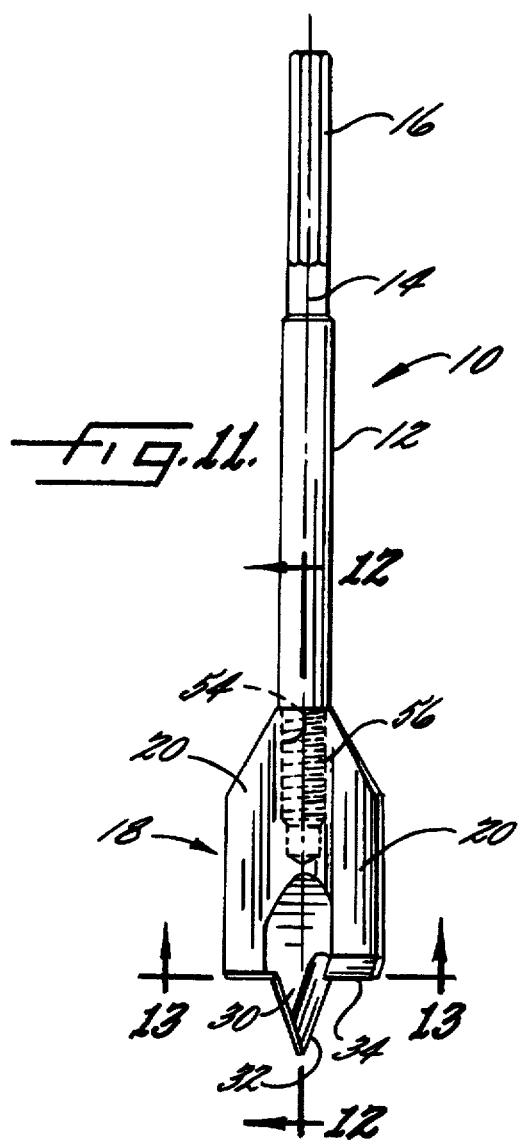
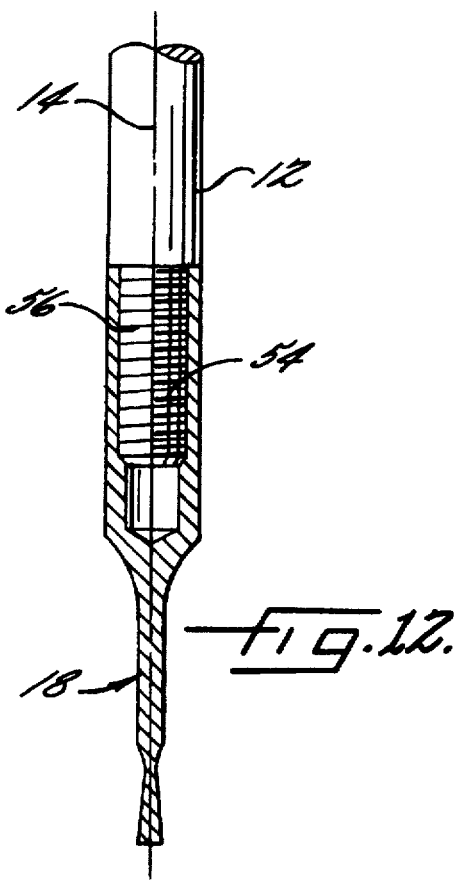
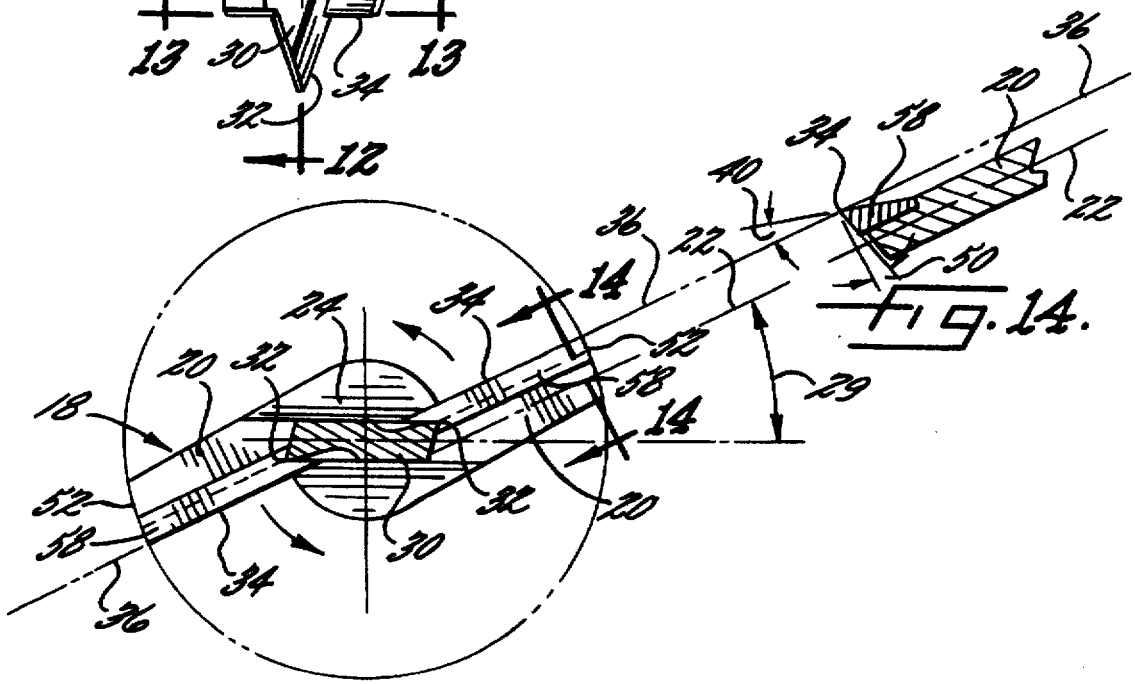

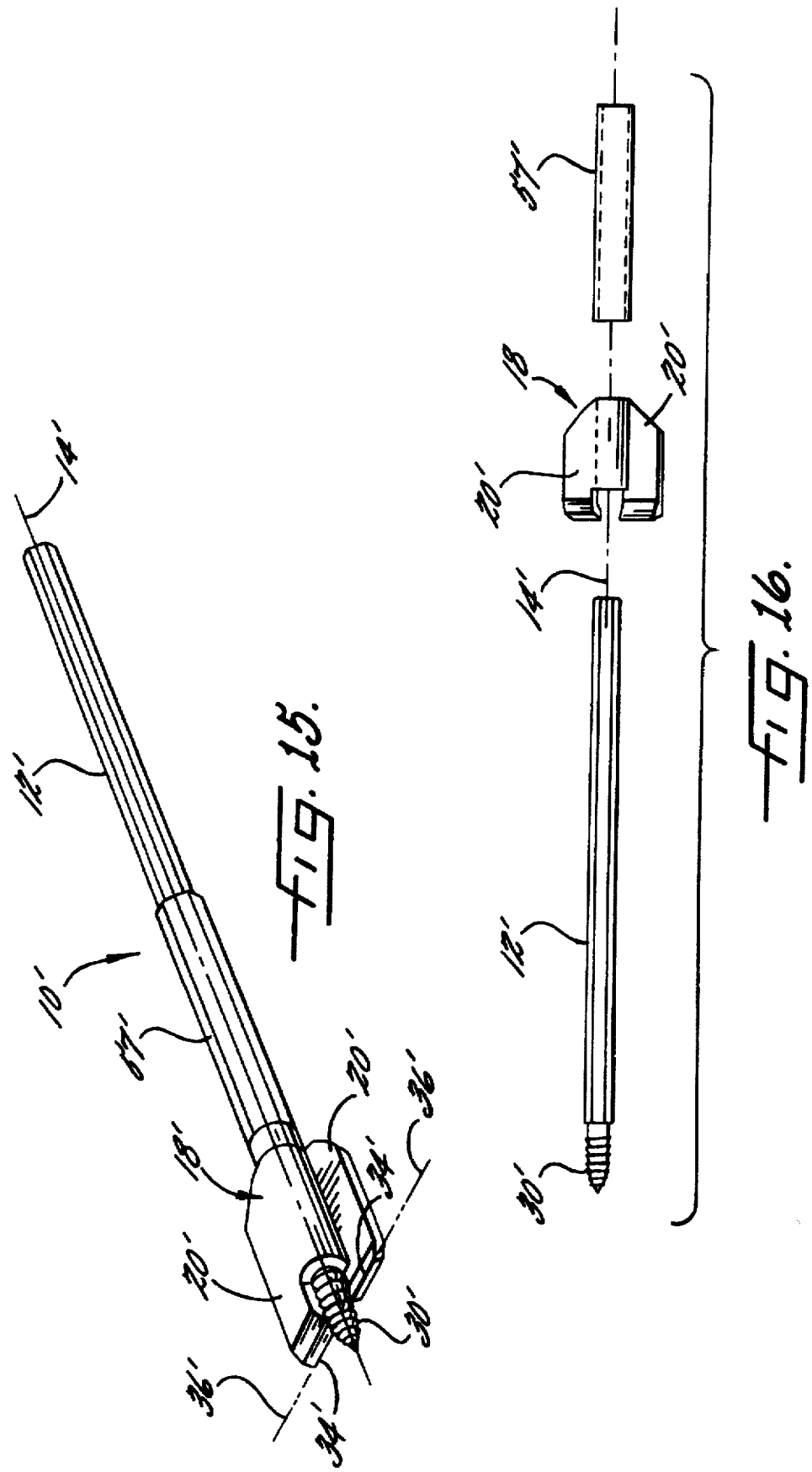

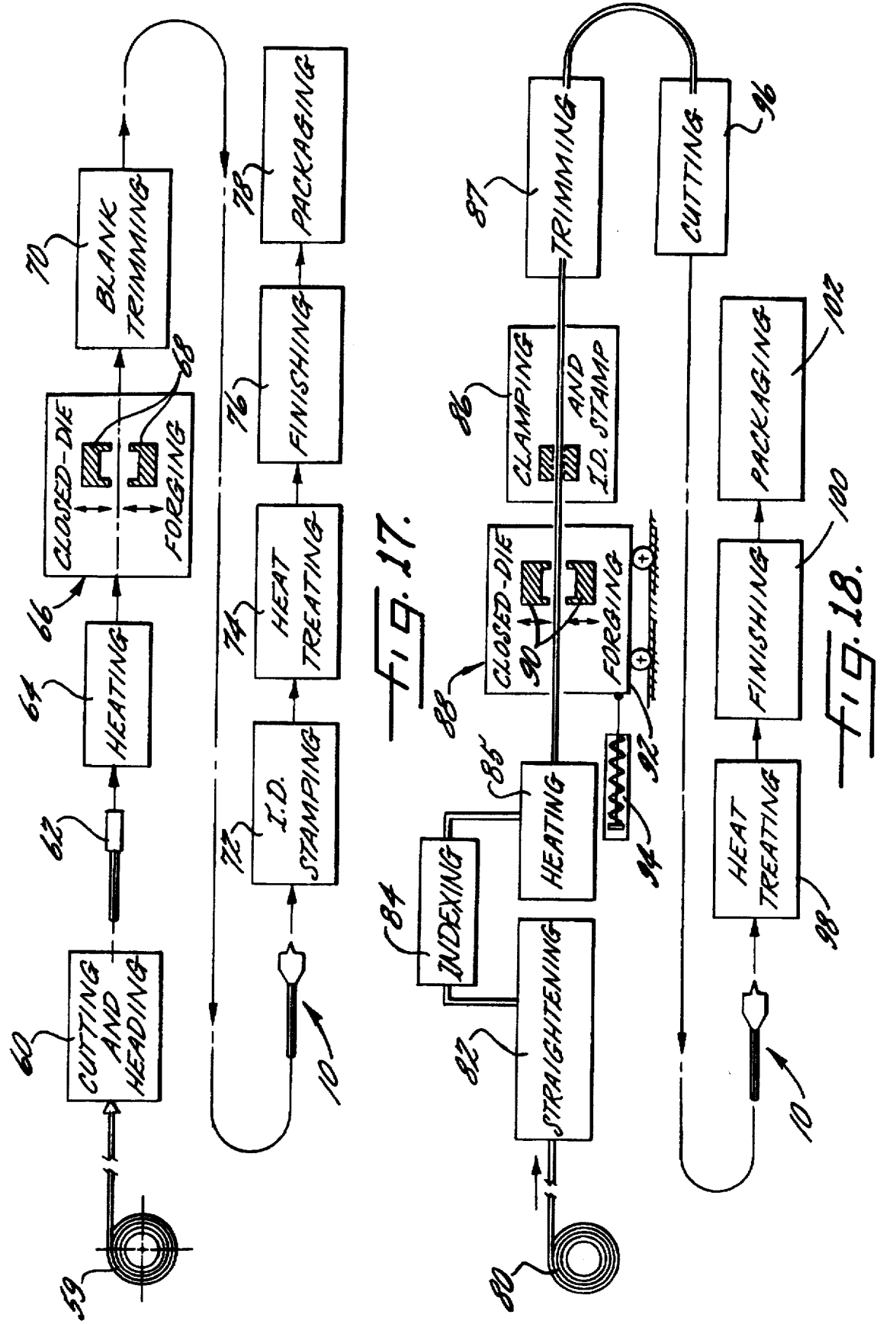

SPADE-TYPE BORING BIT AND AN ASSOCIATED METHOD AND APPARATUS FOR FORMING METALLIC PARTS

FIELD OF THE INVENTION

The present invention relates generally to drill bits and to a method and apparatus for forming metal parts, such as drill bits, and more particularly, to spade-type boring bits and a forging method and apparatus for forming metal parts, such as spade-type boring bits.

BACKGROUND OF THE INVENTION

Spade-type boring bits, hereinafter referred to as "spade bits", are commonly employed to drill or bore holes through wood or other materials. A spade bit is typically used to drill holes having a relatively large diameter from which a large amount of wood or other material must be removed. For example, during the construction of a home, spade bits are often utilized to drill a series of aligned holes through adjacent studs through which conduit or wiring will extend.

As illustrated in FIG. 1, a conventional spade bit 1 includes an elongate shank 2 which defines a longitudinal axis 3. A blade portion 4 is joined to a forward end of the shank and the rear end of the shank, opposite the forward end, is received and held by a drill during drilling operations. The blade portion is generally planar and, as shown in FIG. 2, defines a centerline 5 in the plane of the blade portion and extending through the longitudinal axis. The blade portion also includes a pair of side segments 4 extending laterally in opposite directions. See, for example, U.S. Pat. No. 2,782,824 to Robinson issued Feb. 26, 1957; U.S. Pat. No. 4,682,917 to Williams, III, issued Jul. 28, 1987; U.S. Pat. No. 4,950,111 to Thomas issued Aug. 21, 1990; U.S. Pat. No. 5,061,127 to Thomas issued Oct. 29, 1991; U.S. Pat. No. 5,286,143 to Schimke issued Feb. 15, 1994; and British Patent No. GB 2,130,935A published Jun. 13, 1984. A conventional spade bit also generally includes a generally triangular spur 7 joined to and extending axially from a forward end of the blade portion so as to be coplanar therewith. As known to those skilled in the art, the spur serves to guide and center the spade bit during drilling operations.

The spur 7, as well as each side segment 6, generally includes a cutting edge 8 for removing wood or other material when the spade bit 2 is rotated in a predetermined direction of rotation during drilling operations. In particular, the spur cutting edges extend along opposed sides of the base of the spur at the forward end of the blade portion to the forwardmost portion of the spur, i.e., the spur point. In addition, the cutting edge of each side segment is formed on the forward end of the blade portion such that the side segment cutting edge will engage the workpiece when the spade bit is rotated in the predetermined direction of rotation.

In operation, the cutting edges of the spur 7 initially drill a lead hole in the workpiece. Thereafter, the cutting edges of the side segments 6 engage and remove material from the workpiece to drill a hole of a predetermined diameter. Since the spur 7 of a conventional spade bit 2 is typically coplanar with the generally flat side segments as shown in FIG. 2, each cutting edge of the generally triangular spur is contiguous with the cutting edge of the adjacent side segment. Thus, a pair of continuous cutting edges 8 are formed, each including a cutting edge of the triangular spur and the cutting edge of the adjacent side segment. See, for example, U.S. Pat. No. 2,782,624 to Robinson; U.S. Pat. No. 4,682,917 to Williams, III; U.S. Pat. No. 5,221,166 to Bothum issued Jun. 22, 1993; U.S. Pat. No. 5,286,143 to Schimke; and U.S. Pat. No. 5,291,806 to Bothum issued Mar. 8, 1994.

The chip swarf created during the drilling operations is generally directed radially along the cutting surface and toward the outer periphery of the hole being formed, due to the orientation of the cutting edges and the rotation of the spade bit. However, chip swarf is not as readily removed in the vicinity of the corner formed by the intersection of a spur cutting edge and the cutting edge of an adjacent side segment. Instead, chips accumulate in the corner formed by the spur and adjacent side segment cutting edges since the chips are not directed away from the corner by the intersecting cutting edges. Due to the accumulation of chip swarf, the cutting edge in the vicinity of the corner defined by the spur and the adjacent side segment cutting edges does not readily cut into the workpiece and remove material therefrom. Instead, additional power or torque must be applied to rotate the spade bit and to drill a hole through the workpiece once chip swarf has collected in the corner between the spur and adjacent side segment cutting edges.

A further problem caused by the radially outward movement of the chip swarf along the surfaces of the side segment cutting edges is that the chip swarf is forced into the peripheral wall of the hole being formed, and thus binds between the peripheral wall and the outer edge of the rotating blade portion. This binding further increases the power consumption of the drill.

The primary cause of these problems, as shown in FIG. 2, is that the cutting edges 8 of each side segment 6 are not aligned with the centerline 5 that passes through the longitudinal axis 3. Instead, each cutting edge is positioned in advance of the centerline in the predetermined direction of rotation of the spade bit 1. Since the cutting edges are positioned in advance of the centerline, the chip swarf is not directed solely circumferentially away from the cutting edges. Instead, the rotation of the spade bit also imparts a radial force component to the chip swarf which urges the chip swarf against the peripheral wall.

Spade bits are typically formed by a hot forging process. According to this process, a coil of wire stock of a given diameter is cut into segments, each of which is approximately the length of an individual spade bit. Each segment is then headed to form a portion of material with an increased diameter at the first end of the segment, i.e., a bulb of material having an increased diameter over a shorter length at the first end. Thereafter, the segment is heated and forged by compressing the heated bulb of material between a pair of opposed dies. Typically, the pair of opposed dies are closed in a rectilinear manner such that the heated bulb of material is subjected to compressive forces which urge the material into the predetermined shape defined by the dies. The forged part can then be trimmed and finished to produce spade bits such as those described above. An identification mark can also be stamped on the spade bit during its processing. By initially cutting the wire stock, however, the parts must be individually handled and processed throughout the hot forging process. For example, each individual part must be appropriately aligned during each step of the process to ensure that the spade bits formed thereby are within tolerance.

Regardless of the process by which it is formed, the performance of a spade bit is typically measured by several parameters. One such parameter is the quality of the hole produced by a spade bit as defined by the cleanliness of the hole including the cleanliness of both the entry and exit points. In addition, a spade bit is measured by the speed at which it cuts a hole of a predetermined diameter as well as the power or torque required to cut the hole of the predetermined diameter. Finally, the longevity or life of the spade bit itself, typically measured by hours of use or service, is a parameter. Therefore, it is desirable to develop long-lasting spade bits which rapidly drill high-quality holes while requiring a minimum amount of power or torque.

SUMMARY OF THE INVENTION

In view of the foregoing background, it is therefore an object of the present invention to provide an improved method and apparatus for manufacturing a plurality of metal parts, such as spade bits, which significantly reduces the required handling and processing of individual parts.

It is also an object of the present invention to provide an improved spade-type boring bit.

It is a further and more particular object of the present invention to provide an improved spade-type boring bit having a shape which results in the reduction in the power consumption of the drill by avoiding the accumulation of chip swarf between the cutting edges of the spur and the side segments, and by avoiding the radially outward movement of the chip swarf toward the peripheral wall of the hole being formed.

These and other objects are provided, according to the present invention, by a spade-type boring bit having an elongate shank defining a central longitudinal axis, and a blade portion joined to one end of the shank and including a pair of generally flat side segments, such as wings, extending laterally in opposite directions from the central longitudinal axis. According to one preferred embodiment, the side segments include respective forward cutting edges which are aligned with each other along a centerline which passes through the central longitudinal axis. This alignment of the forward cutting edges along a centerline which passes through the central longitudinal axis results in the chip swarf being directed perpendicularly away from the cutting edges, with no radially outward component of movement. Thus, the chip swarf is not forced radially into the peripheral wall of the hole being formed, and the resulting binding is significantly alleviated. Therefore, the long-lasting spade bit of the present invention efficiently produces high-quality holes.

According to one embodiment, the blade portion also includes a generally flat central segment disposed along the central longitudinal axis which defines a central plane. The central segment includes opposite sides which are parallel to the central axis and which are joined to respective side segments. Further, the opposed side segments preferably define respective lateral planes which are parallel to each other and to the central longitudinal axis, but which are oblique to the central plane of the central segment, thereby producing a blade portion having a distinct Z-shaped cross-section.

The blade portion of the spade bit of the present invention also includes a spur joined to and extending axially from the forward end of the blade portion. In one embodiment, the spur is threaded such that the spade bit is self-feeding. In other embodiments, the spur is preferably of a triangular shape extending to a spur point on the central longitudinal axis. The spur of these embodiments includes a pair of spur cutting edges extending along opposite sides of the spur between the spur point and the forward end of the blade portion. Each spur cutting edge advantageously extends radially outward of at least an innermost portion of the forward cutting edge of the adjacent side segment. In addition, each spur cutting edge is advantageously angularly offset from the forward cutting edge of the adjacent side segment in the predetermined direction of rotation of the spade-type boring bit when viewed along the central longitudinal axis. Thus, each spur cutting edge is both radially and angularly separated from the forward cutting edge of the adjacent side segment.

Further, at least a portion of each spur cutting edge extends axially rearward of the forward cutting edge of the adjacent side segment. Accordingly, each spur cutting edge can also be axially separated from the forward cutting edge of the adjacent side segment. By providing such radial, angular and, in some instances, axial separation between each spur cutting edge and the forward cutting edge of the adjacent side segment, accumulation of chip swarf between the spur cutting edge and the forward cutting edge of the adjacent side segment is significantly reduced, if not eliminated, since no corner is formed therebetween.

According to one embodiment, each side segment includes a cutting blade insert, preferably comprised of a relatively hard material, such as carbide, mounted along the forward end of the respective side segment to thereby define the respective forward edge. In addition, the forward portion of each side segment defines a cutting plane which preferably intersects the lateral plane defined by the respective side segment so that the forward cutting edge of each side segment is disposed angularly in advance of the respective lateral plane in the predetermined direction of rotation of the spade bit. More specifically, the cutting plane and the lateral plane of each respective side segment define a hook angle therebetween of between about 10° and about 20°.

According to another embodiment of the present invention, the spade bit is comprised of multiple discrete parts. In this embodiment, the blade portion preferably defines an internal cavity opening at the rear end to which a forwardly extending member of the shank is joined. The spade bit preferably includes means for interlocking the forwardly extending member of the shank within the internal cavity of the blade portion, such as by complimentary threaded portions defined within the internal cavity of the blade portion and along the forwardly extending member of the shank.

Each side segment can also include a forward end having a forward end surface extending between the respective forward cutting edge and a rear edge. In this embodiment, each forward end surface defines a forward end plane which intersects a plane perpendicular to the central longitudinal axis to thereby define a lip clearance angle of between about 10° and about 20° such that the forward end surface slopes rearwardly from the forward cutting edge to the rear edge. Each side segment also includes a first side along which the side segment is joined to the central segment and an opposed second side defining a second side surface. The second side surface is preferably arcuate or curvilinear in transverse cross-section and tapers inwardly when viewed from the forward end of the spade-type boring bit to define a side surface taper angle of about one-half of 1° to reduce binding of the spade bit during drilling operations.

The present invention also includes a method and apparatus for forging a plurality of parts, such as spade-type boring bits, from a continuous length of metal stock, such as a continuous wire stock. The forging method includes the steps of incrementally advancing the continuous metal stock a predetermined linear distance, such as with an indexing means, such that the metal stock advances longitudinally in a downstream direction. A leading portion of the continuous metal stock is clamped following each incremental advance of the metal stock to hold the leading portion in a fixed location. A portion of the continuous metal stock, upstream of the leading portion, is then forged each time the metal stock is clamped and held at the fixed location. In addition, the longitudinal growth of the continuous metal stock created during the forging step is compensated by permitting upstream longitudinal movement of that portion of the continuous metal stock which is upstream of the fixed location.

The continuous metal stock is preferably forged by radially closing a plurality of dies thereabout. The plurality of closed dies define a cavity of predetermined shape which, in turn, defines the resulting shape of the forged portion of the wire stock. In addition, the plurality of closed dies define entry and exit ports through which the continuous metal stock extends during the forging step.

The plurality of dies are preferably mounted on a carriage which is adapted to move longitudinally. In particular, the carriage is preferably mounted such that the longitudinal growth of the continuous metal stock between the forged portion about which the plurality of dies are radially closed and the leading portion which is clamped causes the carriage to move in the upstream longitudinal direction. Thus, the plurality of dies will remain closed about the same portion of the metal stock during the forging step. The carriage is preferably longitudinally biased to prevent excessive upstream movement of the carriage and to return the carriage to its initial position after each forging step.

After forging a portion of the metal stock, the plurality of dies are radially opened and the leading portion of the metal stock is released such that the continuous metal stock can be incrementally advanced prior to repeating the forging method. Once forged, a portion of the continuous metal stock which extends beyond the clamped leading portion of the metal stock can be cut to separate the forged metal stock into a plurality of discrete parts. In addition, an identification mark can be stamped on a previously forged part during the clamping step.

Accordingly, the forging method of the present invention can produce a plurality of parts, such as the spade bit of the present invention, from a continuous metal stock. The efficiency of the forging process and the quality of the parts formed thereby are enhanced since individual parts need not be handled during the forging operations, since such handling of individual parts generally increase the opportunities for misalignment and contributes to poor tolerance control during the manufacturing process.

Another aspect of the present invention includes a method and apparatus for forging a part of a predetermined shape from a workpiece with opposed forging dies which define a cavity of the predetermined shape therebetween. At least one forging die includes a contact surface which defines a portion of the cavity for contacting and shaping the workpiece into the predetermined shape of the resulting part. The respective contact surface also includes at least one relatively flat portion which defines a contact plane which opposes and is parallel to a relatively flat portion of the other die.

According to this aspect of the present invention, the opposed forging dies are radially closed upon their insertion, such as by a ram, in an internal cavity defined by a die housing. The die housing into which the forging dies are inserted circumferentially encompasses and structurally reinforces the pair of forging dies during the forging process.

The forging dies, typically a pair of forging dies, accordingly move radially inward in a predetermined direction, oblique to the respective contact planes defined by the opposed contact surfaces. The respective contact surfaces therefore impart both axial and radial forces to at least portions of the workpiece to form the part of predetermined shape within the cavity defined between the pair of opposed forging dies. Due to the shape of the contact surfaces and the resulting orientation of the axial and radial forces applied, favorably oriented stresses are generated within the workpiece which facilitate the efficient formation of the part of predetermined shape.

In order to maintain the predetermined alignment of the forging dies, the forging apparatus of this aspect of the present invention preferably includes a side die positioned adjacent each of the opposed side surfaces defined by the forging dies. According to this embodiment, the forging dies and the pair of side dies define a conical die assembly which is received by the internal conical cavity defined by the die housing. The opposed forging dies of this aspect of the present invention can also define entry and exit ports through which a continuous metal stock extends for forging a plurality of parts.

The forging method and apparatus of this aspect of the present invention thus employ simultaneous axial and radial forces to deform a workpiece. Accordingly, thin parts which have a relatively large diameter can be readily forged according to this aspect of the present invention. Further, the power required to forge parts of a predetermined size and shape is reduced in comparison to conventional compressive forging processes by imparting forces at desirable locations within the workpiece by rotating the forging dies within the die housing.

BRIEF DESCRIPTION OF THE DRAWINGS

FIG. 3 is a front elevation view of the spade-type boring bit of the present invention.

FIG. 4 is a side elevation view of a spade-type boring bit of the present invention.

FIG. 5 is an end view of the spade-type boring bit of FIG. 3 when viewed along the line 5—5 of FIG. 3 which is along the central longitudinal axis, and which illustrates the alignment of the forward cutting edges of the side segments along a centerline passing through the central longitudinal axis.

FIG. 6 is a fragmentary side view of a portion of a side segment of the spade-type boring bit of FIG. 5 illustrating the hook angle, and taken along the line 6—6 of FIG. 5.

FIG. 7 is a fragmentary cross-sectional view of a portion of the spur of the spade-type boring bit of FIG. 3 illustrating the spur cutting edge, and taken along the line 7—7 of FIG. 3.

FIG. 11 is a front elevation view of one embodiment of a spade-type boring bit of the present invention in which the elongate shaft and the blade portion are threadably interlocked.

FIG. 12 is a lateral cross-sectional view of the embodiment of the spade-type boring bit of FIG. 11 illustrating the threaded connection of the elongate shaft to the blade portion, and taken along the line 12—12 of FIG. 11.

FIG. 13 is a cross-sectional end view of the embodiment of the spade-type boring bit of FIG. 11, taken along the line 13—13 of FIG. 11, and illustrating the rotation of the blade portion.

FIG. 14 is a fragmentary lateral cross-sectional view of a portion of a side segment of the blade portion of the embodiment of the spade-type boring bit of FIG. 11 illustrating a cutting blade insert, and taken along the line 14—14 of FIG. 13.

FIG. 15 is a perspective view of a self-feeding embodiment of the spade-type boring bit of the present invention which includes a threaded spur.

FIG. 16 is an exploded view of the component parts of the self-feeding embodiment of the spade-type boring bit of FIG. 15.

FIG. 17 is a block diagram of a hot forging process for fabricating the spade-type boring bits of the present invention.

FIG. 18 is a representative block diagram of an exemplary forging process of the present invention for fabricating a plurality of parts, such as the spade-type boring bit of the present invention, from a continuous metal stock.

DETAILED DESCRIPTION OF THE PREFERRED EMBODIMENTS

Figures 1, 2:
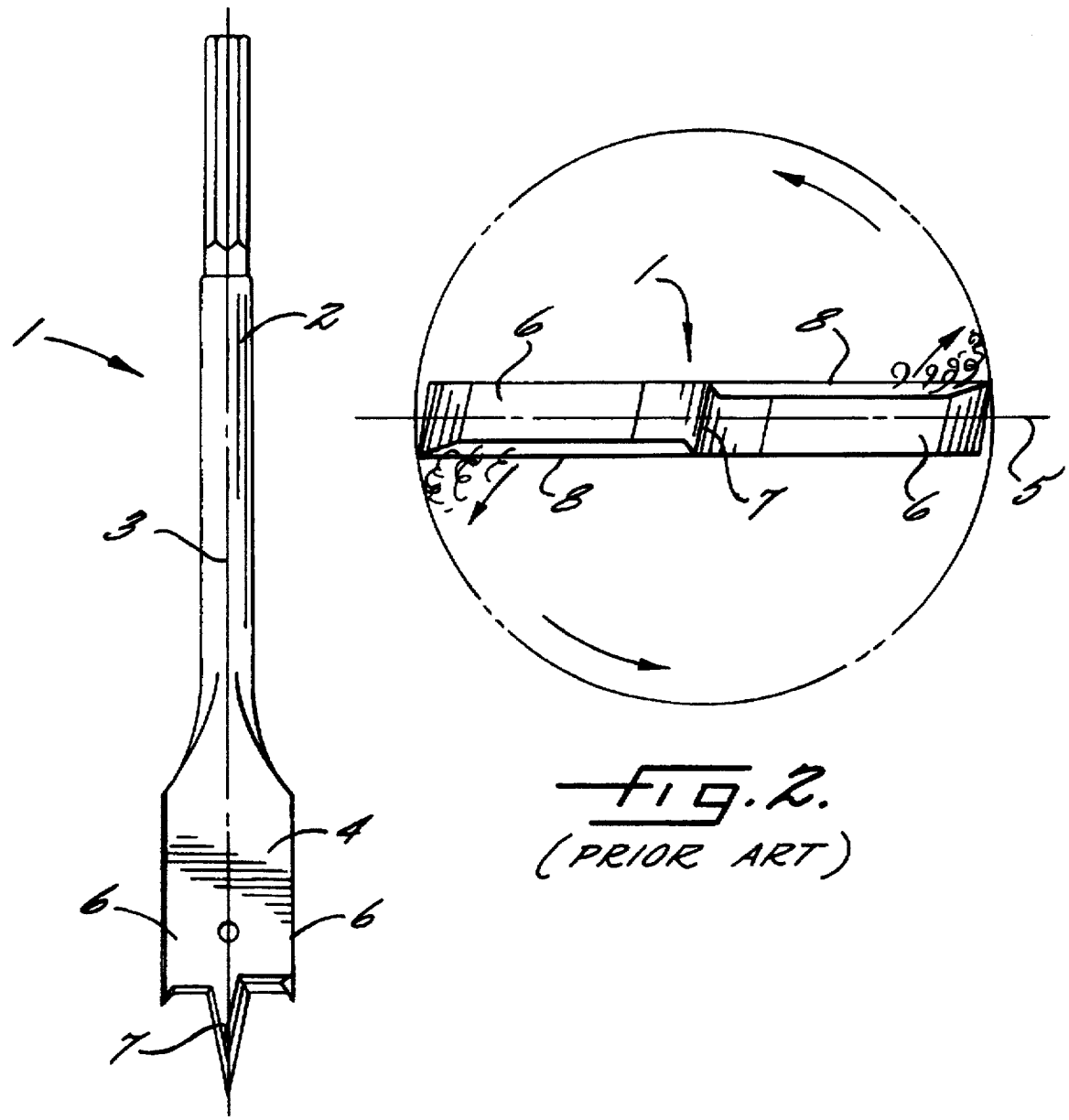
FIG. 1 is a front elevation view of a conventional spade-type boring bit.
FIG. 2 is an end view of a conventional spade-type boring bit of FIG. 1 during a drilling operation.

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

As illustrated in FIGS. 3 and 4, a spade-type boring bit 10 of the present invention, hereinafter referred to as a "spade bit", includes an elongate shank 12 defining a central longitudinal axis 14 therethrough. The rear portion 16 of the shank is adapted to be received and held by a drill (not illustrated). For example, the elongate shank typically includes a cylindrical forward portion and a rear portion 16 that is hexagonal in transverse cross-section so as to be securely received and held by the chuck of a drill (not illustrated).

The spade bit 10 also includes a blade portion 18 joined to a forward end of the elongate shank 12, and which is integrally formed with the shank 12 in the illustrated embodiment. The blade portion includes a pair of generally flat side segments 20 which extend laterally in opposite directions from the central longitudinal axis 14. As shown in FIG. 5, the side segments preferably define respective lateral planes 22 which are parallel to each other and the central longitudinal axis. According to this embodiment of the present invention, the blade portion also includes a generally flat central segment 24 disposed along the central longitudinal axis and defining a central plane 26. More particularly, the central segment includes opposite sides 28 which are parallel to the central longitudinal axis, a rear end which is joined to the forward end of the shank and an opposite forward end. According to this embodiment, the pair of side segments are joined to the central segment along respective sides of the central segment. In particular, the pair of side segments are joined to respective sides of the central segment such that lateral planes 22 defined by the respective side segments 20 intersect the central plane 26 defined by the central segment 24 at an oblique angle 29.

Figure 8:
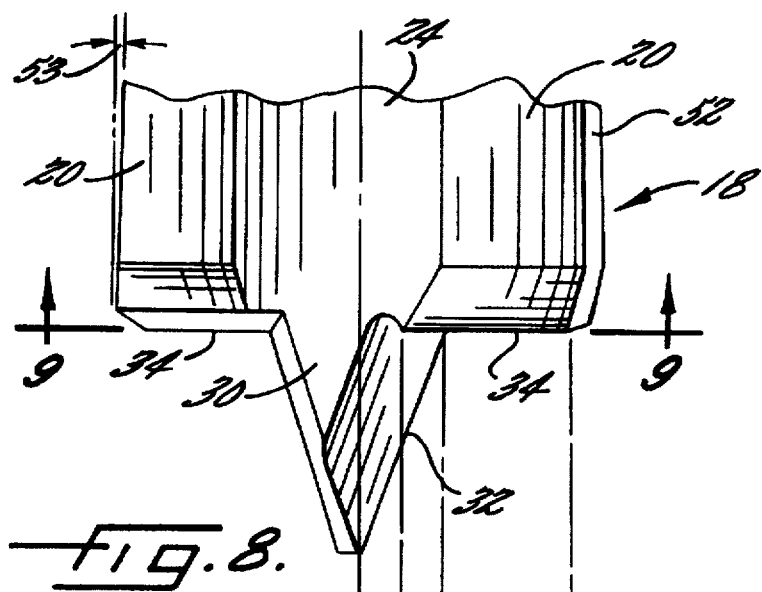
FIG. 8 is a greatly enlarged fragmentary front elevation view of the blade portion of a spade-type boring bit of the present invention.

The blade portion 18 also includes a spur 30 joined to and extending axially from the forward end of the blade portion to center and to guide the spade bit 10 during drilling operations. As best illustrated in FIGS. 3 and 8, the spur of this embodiment is of a generally triangular shape and extends to a spur point on the central longitudinal axis 14. The spur also includes a pair of spur cutting edges 32, shown in cross-section in FIG. 7, extending along opposite sides of the spur between the spur point and a base of the spur at the forward end of the blade portion. The spur cutting edges are positioned to initially contact the workpiece during rotation of the spade bit in the predetermined direction of rotation as indicated by the counterclockwise arrows in FIG. 5.

Each side segment 20 also includes a respective forward cutting edge 34. Each forward cutting edge is defined along the leading edge of the forward end of the respective side segment to initially contact and remove material as the spade bit 10 rotates in a predetermined direction of rotation during drilling operations. As illustrated by the arrows in FIG. 5, the spade bit is adapted to rotate counterclockwise when viewed along the central longitudinal axis 14 from the forward end toward the rear end.

The respective forward cutting edges 34 of the side segments 20 are preferably aligned with each other along a centerline 36 that passes through the central longitudinal axis 14 of the elongate shaft 12 as shown in FIG. 5. By being aligned along the centerline that passes through the central longitudinal axis of the elongate shaft, the forward cutting edges remove material during drilling operations more efficiently than conventional spade bits in which the forward cutting edges of the respective side segments are not aligned with each other, but are instead positioned in advance of a centerline that passes through the central longitudinal axis 14. See, for example, FIG. 2.

More specifically, the power or torque supplied to the spade bit 10 of the present invention during drilling operations is more efficiently transferred, via the aligned forward cutting edges 34, to the workpiece. For a given size of spade bit, the power supplied to the spade bit of the present invention is more efficiently transferred to the workpiece since the moment arm of the spade bit of the present invention is shorter than the moment arm of a conventional spade bit, such as that illustrated in FIGS. 1 and 2, due, at least in part, to the distinct Z-shaped cross-section of the spade bit of the present invention. In addition, the power supplied to the spade bit of the present invention is also more efficiently transferred to the workpiece since the total length of the spur cutting edges 32 and the forward cutting edges of the spade bit of the present invention of a given diameter is less than the total length of the spur cutting edges and the forward cutting edges of a conventional spade bit of the same diameter. Due to the more efficient power transfer, the spade bit of the present invention rotates more rapidly to produce holes of a relatively high quality.

Figure 9:
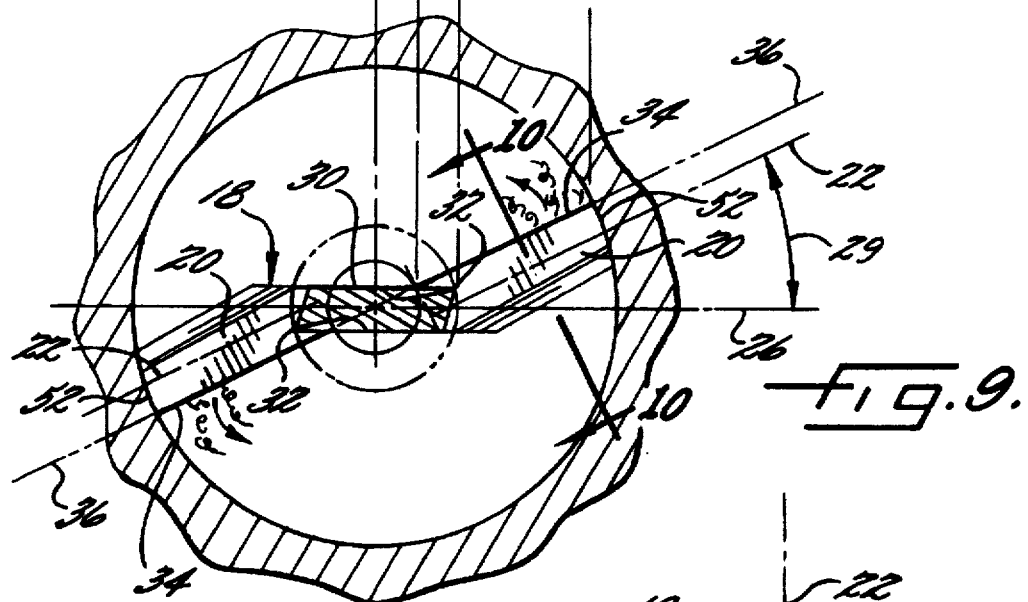
FIG. 9 is a cross-sectional end view of the blade portion of the spade-type boring bit of FIG. 8 during a drilling operation illustrating its distinct Z-shaped cross-section, and taken along the line 9—9 of FIG. 8.
Figure 10:
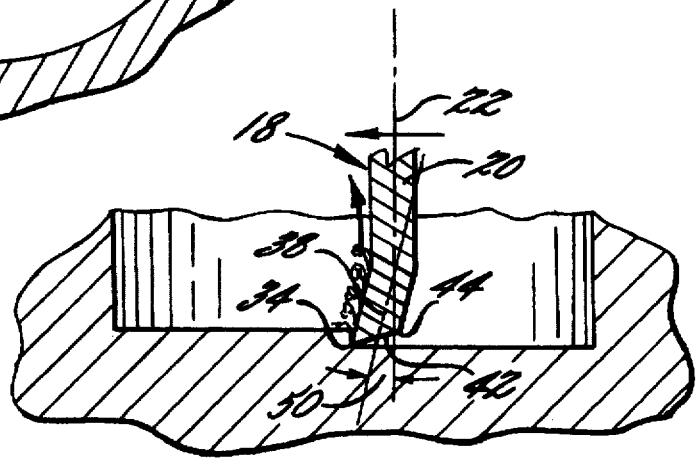
FIG. 10, taken along the line 10—10 of FIG. 9, is a lateral cross-sectional view of a portion of a side segment of the spade-type boring bit during drilling operations to illustrate the resulting chip removal.

The alignment of the forward cutting edges of the side segments 20 along a centerline 36 that passes through the central longitudinal axis 14 further improves the performance of the spade bit by directing the removed chip swarf perpendicularly from the cutting edge and upwardly, and not radially outwardly, as illustrated in FIGS. 9 and 10. By urging the chip swarf in the indicated direction, and not radially outward as urged by conventional spade bits, the chip swarf does not hinder subsequent rotation of the spade bit by binding between the spade bit and the sidewalls of the hole formed thereby. Accordingly, the longevity of the spade bit is increased by reducing the wear on the spade bit and the efficiency with which the spade bit drills a hole of a predetermined diameter is enhanced.

As best illustrated in FIGS. 8 and 9, each spur cutting edge 32 preferably extends radially outward of at least an innermost portion of the forward cutting edge 34 of the adjacent side segment 20. Thus, each spur cutting edge is radially separated from the forward cutting edge of the adjacent side segment. In addition, the spur 30 preferably defines a spur plane which is oblique to the respective lateral planes defined by said side segments such that each spur cutting edge is also preferably angularly offset from the forward cutting edge of the adjacent side segment in the predetermined direction of rotation of the spade bit 10 when viewed along the central longitudinal axis 14. In particular, each spur cutting edge is positioned angularly rearward of the forward cutting edge of the adjacent side segment in the predetermined direction of rotation. Thus, each spur cutting edge is also angularly separated from the forward cutting edge of the adjacent side segment. Further, at least a portion of each spur cutting edge 32 extends axially rearward of the forward cutting edge 34 of the adjacent side segment in the longitudinal direction so that each spur cutting edge is also axially separated from the forward cutting edge of the adjacent side segment.

Due to the separation of each spur cutting edge 32 from the forward cutting edge 34 of the adjacent side segment 20, the spade-type boring bit 10 of the present invention more efficiently removes material during drilling operations. In particular, material is removed by either a spur cutting edge or a forward cutting edge of a side segment and is directed generally rearward from the cutting surface by the respective cutting edge. Due to the separation of the spur cutting edge from the forward cutting edge of the adjacent side segment, little, if any, chip swarf is accumulated therebetween as described above in conjunction with conventional spade bits. Instead, the chip swarf is directed generally rearward from the cutting surface so that the spade bit can continue to cut into the workpiece with both the spur cutting edge and the adjacent forward cutting edge, thereby further improving the efficiency of the drilling operation.

As illustrated in FIG. 6, a forward portion of each side segment preferably defines a cutting plane 38. The cutting plane intersects the lateral plane 22 defined by the respective side segment 20 to define a hook angle 40 therebetween. Preferably, the hook angle is between about 10° and about 20° and, more preferably, is about 15°. The forward cutting edges 34 of the illustrated embodiment are disposed angularly in advance of the lateral planes of the respective side segments in the predetermined direction of rotation of the spade bit 10 when viewed along the central longitudinal axis 14. As shown in FIGS. 9 and 10, chips removed from the workpiece by the forward cutting edge are thereby directed upwardly or rearwardly along the spade bit and away from the cutting surface by further rotation of the spade bit, and, in part, by the hook angle defined between the cutting plane and the lateral plane.

Further, each side segment 20 of the spade bit 10 can also include a forward end having a forward end surface 42 extending between the respective forward cutting edge 34 and a rear edge 44. With reference to FIG. 6, each forward end surface defines a respective forward end plane which intersects a plane 48 perpendicular to the central longitudinal axis 14 to define a lip clearance angle 50 therebetween. Preferably, the lip clearance angle is between about 10° and about 20° and, more preferably, is about 15°. Advantageously, the forward end surface slopes rearwardly from the forward cutting edge to the rear edge such that only the forward cutting edge contacts the cutting surface during drilling operations. Thus, the drag or other frictional forces generated between the rotating spade bit and the workpiece are reduced and the efficiency with which the spade bit of the present invention drills is further improved.

Still further, each side segment 20 of the illustrated embodiment of the spade bit 10 of the present invention includes a first side joined to the central segment 24 along a side 28 thereof, and an opposed second side 52 defining a second or outer side surface. The second or outer side surface extends between respective forward and rear edges and, as shown in FIG. 5, preferably follows the arc of a circle in lateral cross-section to further reduce the drag or other frictional forces generated by the rotation of the spade bit within the hole. Alternatively, the side surface can taper radially inwardly from the forward edge to the rear edge such that only the forward edge of the side surface of the side segment contacts the sidewalls of the hole to thereby further reduce binding of the spade bit.

The second sides 52 of the respective side segments 20 also preferably taper inwardly, axially from the forward end to the rear end of the blade portion 18. Thus, as shown in FIG. 3, a side surface taper angle 53, typically, about one-half of 1°, or ½, is defined between the side surface plane and a line parallel to the central longitudinal axis 14. By tapering the second sides of the side segments inwardly, the side surfaces preferably only contact the workpiece near the cutting surface such that drag or other frictional forces are still further reduced.

The spade bit 10 of the present invention can be integrally fabricated from a single piece of metal as illustrated in FIGS. 3 and 4. Alternatively, the spade bit of the present invention can be formed from the combination of several components without departing from the spirit and scope of the present invention. For example, as illustrated in FIGS. 11 and 12, the elongate shank 12 and the blade portion 18 can be separately formed and subsequently joined to form the spade bit of the present invention.

In particular, the blade portion 18 can include an internal cavity 54 which opens at a rear end to which the elongate shaft 12 is joined. Correspondingly, the elongate shaft 12 can include a forwardly extending member 56 adapted to be received within the internal cavity defined by the blade portion.

The spade bit 10 of this embodiment also includes means for interlocking the forwardly extending member of the shank within the internal cavity of the blade portion. For example, the interlocking means can include complimentarily threaded portions defined within the internal cavity of the blade portion and along the forwardly extending member of the shank such that the shank and the blade portion can be threadably connected. As known to those skilled in the art, the threaded connection is preferably self-tightening such that rotation of the spade bit in the predetermined direction of rotation further tightens the threaded connection between the shank and the blade portion. The spade bit can also include other interlocking means without departing from the spirit and scope of the invention. For example, the blade portion and the shank can be press-fit or joined, such as by brazing, to form a secure interconnection therebetween. In addition, the shank can include the internal cavity and the blade portion can include a corresponding rearwardly extending member for interlocking the pieces without departing from the spirit and scope of the present invention.

As illustrated in FIGS. 13 and 14, each side segment 20 of one embodiment of the spade bit 10 of the present invention can include a cutting blade insert 58. The cutting blade insert is typically comprised of a relatively hard material, such as carbide and is mounted along the forward end of a respective side segment to define the respective forward cutting edge 34. For example, the forward cutting edges defined by the respective cutting blade inserts of this embodiment are also aligned along the centerline 36 that passes through the central longitudinal axis 14 of the elongate shank 12 as described above.

Although a spade bit 10 of the present invention can be comprised of multiple pieces and can also include cutting blade inserts 58 as illustrated in FIGS. 11–14, a spade bit of the present invention can be comprised of multiple pieces without including cutting blade inserts. Likewise, a spade bit of the present invention can be fabricated as an integral unit, but can still include cutting blade inserts 58. Alternatively, the forward cutting edges 34 of a spade bit of the present invention can be formed by depositing a layer of a relatively hard material, such as diamond, on a substrate, namely, the leading edge of the forward end of each side segment 20. The relatively hard material is preferably stronger than the underlying side segments.

As illustrated in FIG. 15, the spade bit of the present invention can also be self-feeding to facilitate entry and advancement of the spade bit through a workpiece. According to this embodiment, the blade portion 18' of the spade bit 10' includes a threaded spur 30' joined to and extending axially from the forward end of the blade portion. As illustrated, the blade portion of the self-feeding embodiment of the spade bit also includes a pair of generally flat side segments 20' that extend laterally in opposite directions from the central longitudinal axis 14' of the spade bit. The side segments include respective forward cutting edges 34' which are aligned with each other along a centerline 36' that passes through the central longitudinal axis. Thus, among the features which the self-feeding embodiment of the spade bit has in common with the other embodiments described above is the Z-shape cross-section of the blade portion, as best illustrated in FIGS. 5, 13 and 15. Accordingly, the self-feeding embodiment of the spade bit illustrated in FIG. 15 also provides the numerous improvements in drilling efficiency described in detail above.

The self-feeding embodiment of the spade bit 10' of the present invention can be fabricated according to any method, such as hot forging, known to those skilled in the art without departing from the spirit and scope of the invention. Alternatively, the self-feeding embodiment of the spade bit can be formed according to the forging process described below. As shown in FIG. 16, however, another method of forming the self-feeding embodiment of the spade bit is to join several pieces to form the spade bit of FIG. 15. In particular, the threaded spur 30' is formed at a first end of an elongate shank 12' by any conventional technique. The remainder of the blade portion, including the oppositely extending side segments 20', is formed as a separate piece which includes an internally threaded bore extending axially therethrough. The remainder of the blade portion is mounted on the elongate shank and threadably engaged to the threaded spur. Thereafter, a tubular sleeve 57' can be placed over and swaged to the elongate shank to securely affix the blade portion to the shank and to form the self-feeding embodiment of the spade bit shown in FIG. 15.

The spade bit 10 of the present invention, and the individual pieces thereof, can be formed from a hot forging process as schematically illustrated in FIG. 17. As shown, a continuous length of metal stock 59, such as wire, is initially cut into a plurality of pieces, each piece of which will eventually form a spade bit. Thereafter, the individual parts are headed to form a bulb of material at a first end of the part 62. Each headed part is then sequentially heated and forged as illustrated by blocks 64 and 66, respectively. For a workpiece comprised of steel alloy, for example, each headed part is heated to a temperature of between 1200° F. and 2200° F. Thereafter, a pair of opposed dies 68 can be closed about the heated part. The opposed dies define a cavity of a predetermined shape which, in turn, defines the resulting shape of the forged part. Once forged, the opposed dies can be opened and the excess flash trimmed from the forged part as shown in block 70. Thereafter, an identification mark, such as the width of the blade portion, can be stamped on the part prior to heat treating, finishing and packaging the spade bit as illustrated in blocks 72, 74, 76 and 78, respectively.

Alternatively, the spade bit 10 of the present invention can be formed by a forging method as illustrated in FIG. 18. While principally described below as a cold forging method, the workpiece can be heated prior to the forging step such that the forging method is a warm or hot forging method. The temperature ranges in which each of the various materials from which the workpiece can be formed must be heated in order to be cold, warm or hot forged depend, among other things, upon the strength and internal properties of the respective material, and are known to those skilled in the art. For example, workpieces comprised of steel alloys typically have a temperature of between room temperature and 300° F. during cold forging operations, a temperature of between 200° F. and 1400° F. during warm forging operations, and a temperature of between 1200° F. and 2200° F. during hot forging operations. In addition, the forging method of the present invention which includes a step of hot forging a workpiece is particularly effective to forge workpieces comprised of a material having a relatively low melting point, such as aluminum, brass, zinc and copper.

In addition, while described in conjunction with the fabrication of a plurality of spade bits of the present invention, the cold forging method illustrated in FIG. 18 can produce a wide variety of parts including, without limitation, screwdriver bits and router bits, and is suitable for manufacturing other metal parts, such as armature shafts.

As illustrated in FIG. 18, a plurality of parts, such as the spade bit, are forged according to the method of the present invention from a continuous length of metal stock 80, such as continuous wire stock. Typically, the metal stock is comprised of a steel alloy, however, the metal stock can be comprised of any forgeable material known to those skilled in the art. For example, the metal stock can be comprised of copper, aluminum, titanium, zinc, brass or alloys thereof.

Regardless of the material, the continuous metal stock is initially straightened, such as by passing the metal stock through a series of aligned rollers, as shown in block 82. The straightened metal stock is then incrementally advanced, such as by an indexer, as shown in block 84. The indexer incrementally advances the continuous metal stock longitudinally a predetermined linear distance in a downstream direction. As illustrated in block 86, a leading portion of the continuous metal stock is clamped, typically by a clamp such as a pair of opposed clamping dies, following each incremental advance of the metal stock, such that the leading portion of the metal stock is held at a fixed location.

Each time the metal stock 80 is clamped and held at a fixed location, a portion of the continuous metal stock, upstream of the leading portion which is clamped, is forged. As shown schematically in block 88 and discussed in more detail below in conjunction with FIGS. 19–21, the means for forging is typically a forge including a plurality of dies 90 which are radially closed about the continuous metal stock. The plurality of closed dies define a cavity of a predetermined shape which, in turn, defines the resulting shape of the forged portion of the metal stock. In addition, the plurality of closed dies define entry and exit ports through which the continuous metal stock extends during the forging step.

As shown in block 85, the metal stock 80 can be warmed prior to the forging step to increase the malleability of the metal stock. For example, an induction coil can be disposed about the continuous metal stock upstream of the plurality of dies 90. Alternatively, the dies can include heating elements to warm the metal stock within the dies, such as by induction heating, during the forging step. However, as described above, the method of the present invention also includes cold forging in which the metal stock is generally unheated or, for a steel alloy stock, has a temperature of between room temperature and 300° F., for example.

During the forging step 88, the continuous metal stock 80 grows longitudinally. This longitudinal growth is compensated by a compensator which permits upstream longitudinal movement of that portion of continuous metal stock which is upstream of the fixed location. In one embodiment, the plurality of forging dies 90 are mounted on a carriage 92 which is adapted to move longitudinally. Thus, the longitudinal growth of the continuous metal stock between the forged portion about which the plurality of dies are radially closed and the leading portion which is clamped causes the carriage to move in the upstream longitudinal direction. Thus, the plurality of dies remain closed about the same portion of the metal stock during each forging step while permitting upstream longitudinal movement of the continuous metal stock, and, in some embodiments, corresponding rotation of the spool upon which the supply of metal stock is mounted, to compensate for longitudinal growth of the metal stock. As illustrated in FIG. 18, the carriage can be longitudinally biased, such as by a spring or other biasing means 94, to prevent excessive movement in the upstream direction and to return the carriage to its initial position after each forging step.

After forging a portion of the metal stock 80, the plurality of dies 90 are radially opened and the leading portion of the metal stock is released by the clamping dies at 86 such that the continuous metal stock can be incrementally advanced by the indexer 84. Thereafter, the clamping and forging steps are preferably repeated to forge another part from the continuous metal stock. As illustrated in block 86, the clamping dies also preferably stamp an identification mark on a previously forged part. In addition, a previously forged part can be trimmed to the predetermined shape of the part by removing the flash or excess material generated during forging of the part as shown in block 87 while the metal stock is clamped and another part is being forged.

As shown in block 96, the part is only cut, such as by cutting means, from the portion of the continuous metal stock 80 which extends beyond the clamped leading portion of the metal stock after the forging and stamping steps. Once separated, the discrete parts can be heat-treated, finished and packaged as shown in blocks 98, 100 and 102, respectively.

By processing the plurality of parts while still joined by the continuous metal stock, the amount of handling of discrete parts is significantly reduced. In addition, the alignment of the dies 90 of the forging means relative to the metal stock can be more accurately maintained to produce high quality parts having sharply defined features, such as, for example, the above-described radial, angular and longitudinal separation of the spur cutting edge 32 from the forward cutting edge 34 of the respective side segments 20 of the blade portion 18 of the spade bit 10 of the present invention. In addition, by altering the amount of the longitudinal advance provided by the indexer, parts of varying lengths can be produced from the same continuous metal stock, such as spade bits having an elongate shank of varying lengths.

Figure 19:
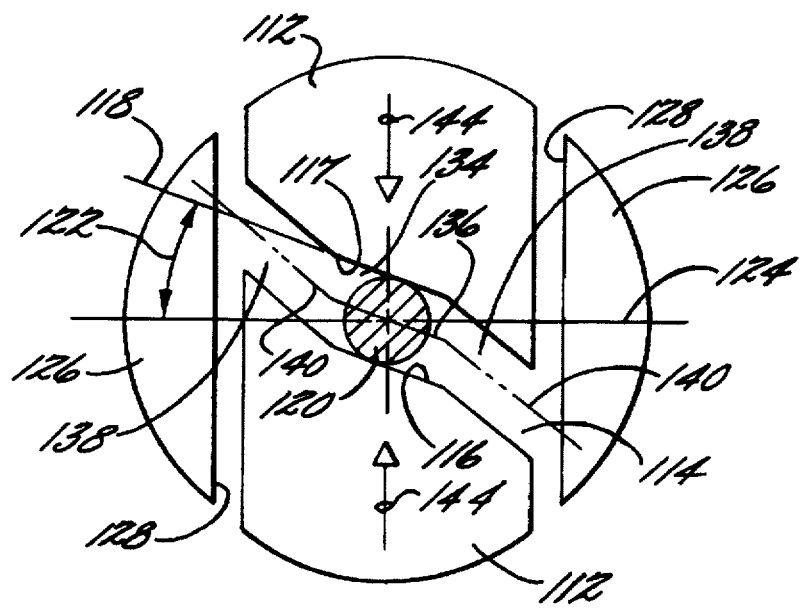
FIG. 19 is a schematic representation of one embodiment of the die assembly of the present invention for applying compressive forces during a forging operation.
Figure 20:
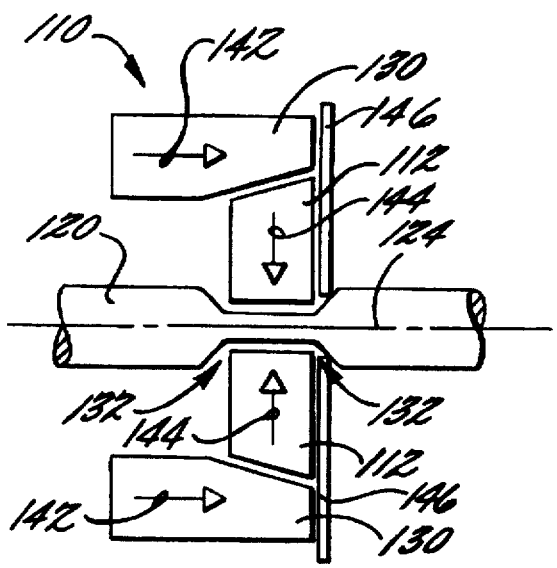
FIG. 20 is a schematic representation of the die assembly and an associated die housing for applying both axial and radial forces which, in turn, generate compressive, tensile and shear stresses within the workpiece during a forging operation.
Figure 21:
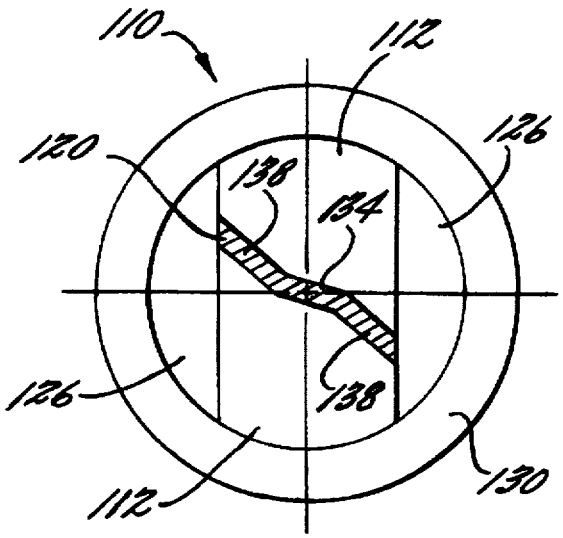
FIG. 21 is a schematic representation of an end view of a die assembly and an associated die housing for applying both compressive and shear forces during a forging operation.

As illustrated in FIGS. 19–21, a part of a predetermined shape can be forged from a workpiece 120 according to the forging method and apparatus of another aspect of the present invention. According to this aspect of the present invention, a plurality of parts, such as spade bits, can be forged from a continuous metal stock as described above or, alternatively, one or more discrete parts can be forged. In addition, the forging method and apparatus of this aspect of the present invention can also produce a wide variety of other parts, such as screwdriver bits and router bits, and is believed to be suitable for manufacturing other metal parts, such as armature shafts.

As shown in FIG. 19, the forging apparatus 110 includes opposed forging dies 112, typically a pair of opposed forging dies, which define a cavity therebetween. The cavity, in turn, defines the resulting shape of the part formed by the forging method and apparatus. More specifically, at least one, and preferably each, forging die can include a contact surface 116 of somewhat Z-shaped configuration and which defines a portion of the cavity. According to one embodiment, the opposed forging dies includes two opposed sets of forging dies, each set of which includes at least one forging die having a contact surface of somewhat Z-shaped configuration.

As described above in conjunction with the spade bit of the present invention, the Z-shaped cavity includes a central portion 134 defining a central plane 136 and opposed side portions 138 extending from opposite sides of the central portion. The opposed side portions define respective lateral planes which are oblique to the central plane. The respective contact surfaces contact and shape the workpiece 120 into the predetermined shape of the resulting part. Each respective contact surface 116 also preferably includes at least a portion which is relatively flat and defines a contact plane 118, and which is parallel to the relatively flat portion of the other die.

The forging apparatus 110 of this aspect of the present invention also includes means for radially closing the opposed forging dies. As described below with respect to FIGS. 20 and 21, the means for radially closing the forging dies includes a die housing 130. In particular, the forging dies 112 move radially inward in a predetermined direction, as shown by the arrows in FIG. 19, upon relative movement between the die housing and the pair of opposed forging dies as shown in FIG. 20, and as described below in detail.

A contact plane 118 of a forging die 112 can be defined by various portions of the respective contact surface 116. For example, as shown in FIG. 19, the center portions 117 of the respective contact surfaces are oblique to the predetermined direction in which the forging dies close and define respective contact planes. Thus, the contact planes impart both axial and radial forces 142 and 144, respectively, to the workpiece which, in turn, result in compressive, tensile and shear stresses within the workpiece during the deformation process. The resulting compressive and shear force components therefore deform the workpiece 120 outwardly into the predetermined shape defined by the forging dies.

More particularly, an angle 122 is defined between the respective contact planes 118 and a reference plane 124 perpendicular to the predetermined direction in which the forging dies 112 move as shown in FIG. 19. In a preferred embodiment, the angle is between about 5° and about 15° and, in one specific example, is about 10°. As used herein, the term "compressive force" includes those forces in the predetermined direction in which the forging dies move, and the term "shear force" includes those lateral forces which tend to deform the workpiece 120 radially outward. Thus, for a given amount of input power, the amount of shear force and compressive force imparted to the workpiece increases and decreases, respectively, as the angle defined between a respective contact plane and the reference plane increases. Likewise, for a given amount of input power, the amount of shear force and compressive force imparted to the workpiece decreases and increases, respectively, as the angle defined between a respective contact plane and the reference plane decreases.

At least parts of the workpiece 120 which are subjected to shear force, and hence shear stress, are more readily deformed since the shear strength of most common workpieces, i.e., most metallic materials, is less than the compressive strength of the same material. Typically, the shear strength of metallic materials is approximately 60% of the compressive strength of the same material. For example, during the formation of a spade bit of the present invention according to this method, both side segments are preferably subjected to relatively high shear stresses for producing the maximum lateral displacement form a workpiece, or wire, of the smallest initial diameter.

Thus, significantly less input power is required to deform a workpiece 120 with shear forces than with compressive forces. In addition, the application of shear forces which more readily deform a workpiece radially outward allows the ratio of the thickness of a part to the width or diameter of a part to be decreased such that thin parts having a relatively large diameter, such as a spade bit, can be readily forged according to this aspect of the present invention.

However, the application of shear force to deform the workpiece 120 significantly increases the forces which the forging dies and die housing must withstand during the forging process and, accordingly, has been avoided in conventional forging processes in which the forging dies are closed in a rectilinear manner to impart compressive forces on the workpiece. In order to withstand the increased forces, the opposed forging dies 112 are comprised, in one preferred embodiment, of a high speed steel and, more preferably, are comprised of CPM® REX™ M4 high speed steel, or an equivalent, marketed by Colt Industries Crucible Specialty Metals Division of Syracuse, N.Y. and described in more detail in a publication entitled Crucible Data Sheet by Colt Industries Crucible Specialty Metals Division bearing document number D88 308-5M-776.

In addition, the time required to deform a workpiece 120 with shear forces is generally greater than the corresponding time required to deform a similar workpiece with compressive forces. Thus, for parts which have a relatively small diameter, such as spade bits having a diameter of about ⅜ inch or less, in which deformation of the workpiece with shear forces will not conserve a significant amount of input power, the angle 122 defined between the respective contact planes 118 and the reference plane 124 is decreased, or eliminated, such that increasing amounts of compressive force are imparted to the workpiece and the deformation process proceeds more quickly. In these embodiments, however, shear forces can still be imparted, albeit in lesser amounts, by the contact surfaces which include oblique lateral portions such as illustrated by the Z-shaped cavity of FIG. 19. For parts with a relatively large diameter, such as spade bits having a diameter of about 7/16 inch or greater, in which deformation of the workpiece with shear force will conserve a significant amount of input power, the respective contact planes are preferably disposed at an angle, such as 10°, for example, with respect to the reference plane.

The means for closing the opposed forging dies preferably includes means for maintaining a predetermined alignment of the opposed forging dies 112 during the forging process. As illustrated in FIGS. 19 and 21, the means for maintaining alignment of the opposed forging dies preferably includes a pair of opposed side dies 126. The opposed side dies are positioned adjacent to the opposed side surfaces 128 defined by the opposed forging dies. As shown schematically in FIG. 21, the opposed forging dies and the pair of side dies define a die assembly which has a generally conical shape.

As also shown schematically in FIGS. 20 and 21, the means for closing the opposed forging dies preferably includes a die housing 130, including end plates 146, defining a conical cavity therein. The internal conical cavity defined by the die housing is adapted for receiving the complementarily-shaped conical die assembly such that the die housing circumferentially encompasses the die assembly. Thus, by axially inserting the die assembly into the die housing, such as with a die press or conical ram (not illustrated), the opposed forging dies and the pair of side dies are radially closed about the workpiece. The strength of the die assembly and its resulting ability to withstand forces generated during the deformation of the workpiece with axial and compressive forces 142 and 144 which, in turn, generate compressive, tensile and shear stresses is further enhanced by radial direction in which the die assembly is closed and the surrounding relationship of the die housing to the die assembly.

The die housing 130 is also preferably comprised of a relatively strong material, such as by high speed steel and, more preferably, CPM® REX™ M4 high speed steel. Further, while the pressure or force required to insert the die assembly into the die housing will vary depending upon the processing conditions, including the type of material from which the workpiece is formed and the size and shape of the resulting part, a hydraulic press, such as a 500 ton press, has produced spade bits of the present invention from 1050 carbon steel.

In addition, one embodiment of the die assembly of this aspect of the present invention can also define entry and exit ports 132 as shown in FIG. 20 through which a continuous metal stock can extend such that a plurality of parts can be formed as described above. However, the forging method and apparatus of this aspect of the present invention can also be employed to form discrete parts without departing from the spirit and scope of the invention.

In the drawings and the specification, there has been set forth preferred embodiments of the invention and, although specific terms are employed, the terms are used in a generic and descriptive sense only and not for purpose of limitation, the scope of the invention being set forth in the following claims.

That which is claimed is:

1. A spade-type boring bit comprising
    an elongate shank defining a central longitudinal axis; and
    a blade portion joined to one end of said shank, said blade portion comprising:
        a generally flat central segment disposed along the central longitudinal axis and defining a central plane, said central segment including opposite sides which are parallel to said central axis, a rear end which is joined to said one end of said shank, and an opposite forward end;
        a pair of generally flat side segments joined to said central segment along respective sides thereof, said side segments defining respective lateral planes which are parallel to each other and which intersect said central plane at an oblique angle, each side segment also including a respective forward cutting edge; and
        a spur joined to and extending axially from the forward end of said central segment.

2. A spade-type boring bit according to claim 1 wherein said respective forward cutting edges of said side segments are aligned with each other along a centerline which passes through the central longitudinal axis of said elongate shank.

3. A spade-type boring bit according to claim 1 wherein said spur is of a generally triangular shape extending in the central plane to a spur point on the central longitudinal axis, said spur including a pair of spur cutting edges extending along opposite sides of said spur between the spur point and the forward end of said central segment such that each spur cutting edge extends radially outward of at least an innermost portion of the forward cutting edge of the adjacent side segment, and wherein each spur cutting edge is angularly offset from the forward cutting edge of the adjacent side segment in a predetermined direction of rotation of the spade-type boring bit when viewed along the central longitudinal axis, such that each spur cutting edge is both radially and angularly separated from the forward cutting edge of the adjacent side segment.

4. A spade-type boring bit according to claim 3 wherein at least a portion of each spur cutting edge extends axially rearward of the forward cutting edge of the adjacent side segment such that each spur cutting edge is axially separated from the forward cutting edge of the adjacent side segment.

5. A spade-type boring bit according to claim 1 wherein each side segment includes a cutting blade insert mounted along a forward end of said respective side segment to thereby define the respective forward cutting edge.

6. A spade-type boring bit according to claim 5 wherein each cutting blade insert is comprised of carbide.

7. A spade-type boring bit according to claim 1 wherein the forward end of each respective side segment includes a layer of a relatively hard material to thereby define the respective forward cutting edge wherein the relatively hard material is stronger than the material comprising the respective side segments.

8. A spade-type boring bit according to claim 1 wherein a forward portion of each side segment defines a cutting plane which intersects the lateral plane defined by the respective side segment such that the forward cutting edge of each side segment is disposed angularly in advance of the respective lateral plane in a predetermined direction of rotation of the spade-type boring bit when viewed along the central longitudinal axis.

9. A spade-type boring bit according to claim 8 wherein the cutting plane and the lateral plane of each respective side segment define a hook angle therebetween, the hook angle being between about 10° and about 20°.

10. A spade-type boring bit according to claim 1 wherein said blade portion defines an internal cavity opening at the rear end of said central segment to which said elongate shank is joined, and wherein said elongate shank includes a forwardly extending member adapted to be received within the internal cavity of said shank, the spade-type boring bit further comprising means for interlocking the forwardly extending member of said shank within the internal cavity of said central segment.

11. A spade-type boring bit according to claim 10 wherein said interlocking means includes complimentary threaded portions defined within the internal cavity of said central segment and along the forwardly extending member of said shank such that said shank and said blade portion can be threadably connected.

12. A spade-type boring bit according to claim 1 wherein each side segment includes a forward end having a forward end surface extending between the respective forward cutting edge and a rear edge, each forward end surface defining a forward end plane which intersects a plane perpendicular to the central longitudinal axis to thereby define a lip clearance angle such that the forward end surface slopes rearwardly from the forward cutting edge to the rear edge.

13. A spade-type boring bit according to claim 12 wherein the lip clearance angle is between about 10° and about 20°.

14. A spade-type boring bit according to claim 1 wherein each side segment includes a first side along which said side segment is joined to said central segment and an opposed second side defining an arcuate second side surface extending between respective forward and rear edges.

15. A spade-type boring bit according to claim 14 wherein said blade portion includes a forward end and an opposed rear end and wherein the second side tapers axially inward from the forward end to the rear end of said blade portion such that a side surface taper angle of about one-half of 1° is defined between the respective side surface and a line parallel to the central longitudinal axis.

16. A spade-type boring bit comprising:
    an elongate shank defining a central longitudinal axis; and
    a blade portion joined at a rear end to one end of said shank along the central longitudinal axis, said blade portion including:
        a pair of generally flat side segments which extend laterally in opposite directions from the central longitudinal axis, said side segments defining respective lateral planes which are parallel to each other and the central longitudinal axis, said side segments also including respective forward cutting edges wherein at least one forward cutting edge lies along a centerline which passes through the central longitudinal axis, and
        a spur joined to and extending axially from a forward end of said blade portion opposite the rear end.

17. A spade-type boring bit according to claim 16 wherein said blade portion further includes a generally flat central segment including opposite sides along which respective sides of said side segments are joined, said central segment being disposed along the central longitudinal axis and defining a central plane which intersects the respective lateral planes at an oblique angle.

18. A spade-type boring bit according to claim 16 wherein said spur is threaded such that the spade-type boring bit is self-feeding.

19. A spade-type boring bit according to claim 16 wherein said spur is of a generally triangular shape and defines a spur plane which is oblique to and which intersects the respective lateral planes defined by said side segments, said spur also defining a spur base along which said spur is joined to the forward end of said blade portion, a spur point aligned with the central longitudinal axis, and a pair of spur cutting edges extending along opposite sides of said spur between the spur point and the spur base such that each spur cutting edge extends radially outward of at least an innermost portion of the forward cutting edge of the adjacent side segment, and wherein each spur cutting edge is angularly offset from the forward cutting edge of the adjacent side segment in a predetermined direction of rotation of the spade-type boring bit when viewed along the central longitudinal axis, such that each spur cutting edge is both radially and angularly separated from the forward cutting edge of the adjacent side segment.

20. A spade-type boring bit according to claim 19 wherein at least a portion of each spur cutting edge extends longitudinally rearward of the forward cutting edge of the adjacent side segment such that each spur cutting edge is longitudinally separated from the forward cutting edge of the adjacent side segment.

21. A spade-type boring bit according to claim 16 wherein each side segment includes a carbide cutting blade insert mounted along a forward end of said respective side segment to thereby define the respective forward cutting edge.

22. A spade-type boring bit according to claim 16 wherein each respective side segment includes a layer of a relatively hard material to thereby define the respective forward cutting edge wherein the relatively hard material is stronger than the material comprising the respective side segments.

23. A spade-type boring bit according to claim 16 wherein a forward portion of each side segment defines a cutting plane which intersects the lateral plane defined by the respective side segment such that the forward cutting edge of each side segment is disposed angularly in advance of the respective lateral plane in a predetermined direction of rotation of the spade-type boring bit when viewed along the central longitudinal axis to thereby define a hook angle of between about 10° and about 20° between the cutting plane and the lateral plane of each respective side segment.

24. A spade-type boring bit according to claim 16 wherein said blade portion defines an internal cavity opening at the rear end of said blade portion to which said shank is joined, and wherein said shank includes a forwardly extending member adapted to be received within the internal cavity of said blade portion, the spade-type boring bit further comprising means for interlocking the forwardly extending member of said shank within the internal cavity of said blade portion.

25. A spade-type boring bit according to claim 24 wherein said interlocking means includes complimentary threaded portions defined within the internal cavity of said blade portion and along the forwardly extending member of said shank such that said shank and said blade portion can be threadably connected.

26. A spade-type boring bit according to claim 16 wherein each side segment includes a forward end having a forward end surface extending between the respective forward cutting edge and a rear edge, each forward end surface defining a forward end plane which intersects a plane perpendicular to the central longitudinal axis to thereby define a lip clearance angle such that the forward end surface slopes rearwardly from the forward cutting edge to the rear edge.

27. A spade-type boring bit according to claim 26 wherein the lip clearance angle is between about 10° and about 20°.

28. A spade-type boring bit according to claim 16 wherein each side segment includes a first side along which said side segment is joined to said central segment and an opposed second side defining an arcuate second side surface extending between respective forward and rear edges.

29. A spade-type boring bit according to claim 28 wherein said blade portion includes a forward end and an opposed rear end and wherein the second side tapers axially inward from the forward end to the rear end of said blade portion such that a side surface taper angle of about one-half of 1° is defined between the respective side surface and a line parallel to the central longitudinal axis.

30. A spade-type boring bit comprising:

an elongate shank defining a central longitudinal axis:

a blade portion joined at a rear end to one end of said shank along the central longitudinal axis, said blade portion including:

a pair of generally flat side segments which extend laterally in opposite directions from the central longitudinal axis, said side segments including respective forward cutting edges; and a generally triangular spur joined to and extending axially from a forward end of said blade portion opposite the rear end, said spur defining a spur base along which said spur is joined to the forward end of said blade portion, a spur point aligned with the central longitudinal axis, and a pair of spur cutting edges extending along opposite sides of said spur between the spur point and the spur base such that each spur cutting edge extends radially outward of at least an innermost portion of the forward cutting edge of the adjacent side segment, and wherein each spur cutting edge is angularly offset from the forward cutting edge of the adjacent side segment in a predetermined direction of rotation of the spade-type boring bit when viewed along the central longitudinal axis, such that each spur cutting edge is both radially and angularly separated from the forward cutting edge of the adjacent side segment.

31. A spade-type boring bit according to claim 30 wherein at least a portion of each spur cutting edge extends longitudinally rearward of the forward cutting edge of the adjacent side segment such that each spur cutting edge is longitudinally separated from the forward cutting edge of the adjacent side segment.

32. A spade-type boring bit according to claim 30 wherein said side segments define respective lateral planes and said spur defines a spur plane which is oblique to the respective lateral planes defined by said side segments.

33. A spade-type boring bit according to claim 32 wherein the lateral planes defined by said side segments are parallel to each other and the central longitudinal axis, and wherein the respective forward cutting edges are aligned with each other along a centerline which passes through the central longitudinal axis.

34. A spade-type boring bit according to claim 32 wherein a forward portion of each side segment defines a cutting plane which intersects the lateral plane defined by the respective side segment such that the forward cutting edge of each side segment is disposed angularly in advance of the respective lateral plane in a predetermined direction of rotation of the spade-type boring bit when viewed along the central longitudinal axis to thereby define a hook angle of between about 10° and about 20° between the cutting plane and the lateral plane of each respective side segment.

35. A spade-type boring bit according to claim 30 wherein said blade portion defines an internal cavity opening at the rear end of said blade portion to which said shank is joined, and wherein said shank includes a forwardly extending member adapted to be received within the internal cavity of said blade portion, the spade-type boring bit further comprising means for interlocking the forwardly extending member of said shank within the internal cavity of said blade portion.

36. A spade-type boring bit according to claim 35 wherein said interlocking means includes complimentary threaded portions defined within the internal cavity of said blade portion and along the forwardly extending member of said shank such that said shank said blade portion can be threadably connected.

37. A spade-type boring bit according to claim 30 wherein each side segment includes a carbide cutting blade insert mounted along a forward end of said respective side segment to thereby define the respective forward cutting edge.

38. A spade-type boring bit according to claim 30 wherein each respective side segment includes a layer of a relatively hard material to thereby define the respective forward cutting edge wherein the relatively hard material is stronger than the material comprising the respective side segments.

39. A spade-type boring bit according to claim 30 wherein each side segment includes a forward end having a forward end surface extending between the respective forward cutting edge and a rear edge, each forward end surface defining a forward end plane which intersects a plane perpendicular to the central longitudinal axis to thereby define a lip clearance angle such that the forward end surface slopes rearwardly from the forward cutting edge to the rear edge.

40. A spade-type boring bit according to claim 39 wherein the lip clearance angle is between about 10° and about 20°.

41. A spade-type boring bit according to claim 30 wherein each side segment includes a first side along which said side segment is joined to said central segment and an opposed second side defining an arcuate second side surface extending between respective forward and rear edges.

42. A spade-type boring bit according to claim 41 wherein said blade portion includes a forward end and an opposed rear end and wherein the second side tapers axially inward from the forward end to the rear end of said blade portion such that a side surface taper angle of about one-half of 1° is defined between the respective side surface and a line parallel to the central longitudinal axis.

43. A spade-type boring bit according to claim 30 wherein at least one forward cutting edge lies along a centerline which passes through the central longitudinal axis elongated shank.

44. A spade-type boring bit having a blade portion with a predetermined cross-sectional shape, the spade-type boring bit being manufactured from a continuous metal stock according to a forging process comprising the steps of:

incrementally advancing the continuous metal stock a predetermined linear distance such that the metal stock advances longitudinally in a downstream direction;

clamping a leading portion of the continuous metal stock following each incremental advance of the metal stock so as to hold the leading portion in a fixed location;

forging a portion of the continuous metal stock, upstream of the leading portion, to the predetermined cross-sectional shape of the blade portion of a respective spade-type boring bit each time the metal stock is clamped and held at the fixed location, wherein said forging step comprises forging a portion of the continuous metal stock to form the blade portion having a generally flat central segment defining a central plane, a pair of generally flat side segments joined to opposite sides of the central segment and defining respective lateral planes which are parallel to each other and which intersect the central plane at an oblique angle, and a spur joined to a forward end of the central segment; and compensating for longitudinal growth of the continuous metal stock created during each forging step by permitting upstream longitudinal movement of that portion of the continuous metal stock which is upstream of the fixed location.

45. A spade-type boring bit manufactured according to claim 44 wherein each forging step includes a step of radially closing a plurality of dies about the continuous metal stock wherein the plurality of closed dies define a cavity of a predetermined shape which defines the resulting shape of the blade portion having the generally flat central segment defining the central plane, the pair of generally flat side segments joined to opposite sides of the central segment and defining respective lateral planes which are parallel to each other and which intersect the central plane at an oblique angle, and the spur joined to the forward end of the central segment, and wherein the opposed dies define entry and exit ports through which the continuous metal stock extends during forging step.

46. A spade-type boring bit manufactured according to claim 44 further comprising the step of stamping an identification mark on a previously forged spade-type boring bit such that the resulting spade-type boring bit includes the identificiation stamp.

47. A spade-type boring bit having an elongate shank defining a central longitudinal axis, a blade portion joined to one end of the elongate shank and including a pair of side segments extending laterally in opposite directions from the central longitudinal axis, and a spur joined to and extending axially from the blade portion, the spade-type boring bit being manufactured from a continuous metal stock according to a forging process comprising the steps of:

incrementally advancing the continuous metal stock a predetermined linear distance such that the metal stock advances longitudinally in a downstream direction;

clamping a leading portion of the continuous metal stock following each incremental advance of the metal stock so as to hold the leading portion in a fixed location;

forging a portion of the continuous metal stock upstream of the leading portion into the blade portion of a respective spade-type boring bit each time the metal stock is clamped and held at the fixed location, wherein said forging step comprises forging a portion of the continuous metal stock to form the blade portion having the pair of generally flat side segments defining respective lateral planes which are parallel to each other and the central longitudinal axis and which include respective forward cutting edges, at least one forward cutting edge lying along a centerline which passes through the central longitudinal axis; and compensating for longitudinal growth of the continuous metal stock created during each forging step by permitting upstream longitudinal movement of that portion of the continuous metal stock which is upstream of the fixed location.

48. A spade-type boring bit manufactured according to claim 47 wherein each forging step includes a step of radially closing a plurality of dies about the continuous metal stock wherein the plurality of closed dies define a cavity of a predetermined shape which defines the resulting shape of the spade-type boring bit having the pair of generally flat side segments defining respective lateral planes which are parallel to each other and the central longitudinal axis and which include respective forward cutting edges, at least one forward cutting edge lying along the centerline which passes through the central longitudinal axis, and wherein the plurality of closed dies define entry and exit ports through which the continuous metal stock extends during each forging step.

49. A spade-type boring bit manufactured according to claim 47 further comprising the step of stamping an identification mark on a previously forged spade-type boring bit such that the resulting spade-type boring bit includes the identification stamp.

50. A method of drilling a hole in a workpiece comprising the steps of:

provi ding a spade-type boring bit having an elongate shank defining a central longitudinal axis, a blade portion joined to one end of the elongate shank and a spur joined to and extending axially from the blade portion wherein the blade portion includes a pair of side segments extending laterally in opposite directions from the central longitudinal axis to define respective lateral planes which are parallel to each other and the central longitudinal axis, the pair of side segments also including respective forward cutting edges, at least one forward cutting edge lying along a centerline which passes through the central longitudinal axis;

entering the workpiece with the spade-type drill bit such that the spur guides the spade-type drill bit into the workpiece;

rotating the spade-type drill bit in a predetermined direction to form a hole in the workpiece wherein said rotating step comprises the steps of engaging and removing portions of the workpiece with the forward cutting edges of the blade portion of the spade-type drill bit, thereby creating chip swarf; and directing the chip swarf created during said rotating step in a direction perpendicular to the respective forward cutting edges;

while preventing chip swarf from migrating radially outward in the hole and binding between the spade-type drill bit and the peripheral wall of the hole created in the workpiece.

51. A method according to claim 50 further comprising the steps of:

advancing the spade-type drill bit forward in a longitudinal direction through the workpiece; and directing the chip swarf created during said rotating step in a longitudinally rearward direction, opposite the forward direction in which the spade-type drill bit is advanced, such that the chip swarf is removed from the surface of the workpiece engaged by the spade-type drill bit.

52. A method of drilling a hole in a workpiece comprising the steps of:

providing a spade-type boring bit having an elongate shank defining a central longitudinal axis, a blade portion joined to one end of the elongate shank and including a pair of side segments extending laterally in opposite directions from the central longitudinal axis and having respective forward cutting edges, and a generally triangular spur joined to and extending axially from the blade portion and including a spur base along which the spur is joined to the blade portion, a spur point, and a pair of spur cutting edges extending along opposite sides of the spur between the spur point and the spur base such that each spur cutting edge extends radially outward of at least an innermost portion of the forward cutting edge of the adjacent side segment, and wherein each spur cutting edge is angularly offset from the forward cutting edge of the adjacent side segment in a predetermined direction of rotation of the spade-type boring bit when viewed along the central longitudinal axis such that each spur cutting edge is both radially and angularly separated from the forward cutting edge of the adjacent side segment;

entering the workpiece with the spade-type drill bit such that the spur guides the spade-type drill bit into the workpiece;

rotating the spade-type drill bit in a predetermined direction to form a hole in the workpiece wherein said rotating step comprises the steps of engaging and removing portions of the workpiece with both the forward cutting edges of the blade portion and the spur cutting edges of the spade-type drill bit, thereby creating chip swarf; and directing the chip swarf created during said rotating step away from the surface of the workpiece engaged by the spade-type boring bit;

while preventing chip swarf from accumulating between a spur cutting edge and the forward cutting edge of the adjacent side segment.

53. A method according to claim 52 further comprising the steps of:

advancing the spade-type drill bit forward in a longitudinal direction through the workpiece; and directing the chip swarf created during said rotating step in a longitudinally rearward direction, opposite the forward direction in which the spade-type drill bit is advanced, such that the chip swarf is removed from the surface of the workpiece engaged by the spade-type drill bit.

54. A method of drilling a hole in a workpiece comprising the steps of:

providing a spade-type boring bit having an elongate shank defining a central longitudinal axis, a blade portion joined to one end of the elongate shank and a spur joined to and extending axially from the blade portion wherein the blade portion includes a generally flat central segment disposed along the central longitudinal axis and defining a central plane, and a pair of generally flat side segments joined to opposite sides of the central segment and defining respective lateral planes which are parallel to each other and which intersect said central plane at an oblique angle, each side segment also including a respective forward cutting edge;

entering the workpiece with the spade-type drill bit such that the spur guides the spade-type drill bit into the workpiece;

rotating the spade-type drill bit in a predetermined direction to form a hole in the workpiece such that the spade-type drill bit longitudinally advances in a forward direction wherein said rotating step comprises the steps of engaging and removing portions of the workpiece with the forward cutting edges of the blade portion of the spade-type drill bit, thereby creating chip swarf; and directing the chip swarf created during said rotating step in a longitudinally rearward direction, opposite the forward direction in which the spade-type drill bit is advanced, such that the chip swarf is removed from the surface of the workpiece engaged by the spade-type drill bit.

55. A spade-type boring bit according to claim 1 wherein at least one forward cutting edge lies along a centerline which passes through the central longitudinal axis of said elongate shank.

56. A spade-type boring bit according to claim 16 wherein said respective forward cutting edges of both said side segments are aligned with each other along the centerline which passes through the central longitudinal axis of said elongate shank.

* * * * *